United States Patent

[11] 3,632,323

| [72] | Inventors | Albert Sidney Robinson<br>Southport;<br>Jack Lawrenson, St. Helens, both of England |
|---|---|---|
| [21] | Appl. No. | 781,797 |
| [22] | Filed | Dec. 6, 1968 |
| [45] | Patented | Jan. 4, 1972 |
| [73] | Assignee | Pilkington Brothers Limited<br>Liverpool, England |
| [32] | Priority | Dec. 28, 1967 |
| [33] | | Great Britain |
| [31] | | 58,939/67 |

[54] METHOD AND APPARATUS FOR MODIFICATION OF ARTICLE SURFACE CHARACTERISTICS IN A FLOAT GLASS PROCESS
2 Claims, 8 Drawing Figs.

[52] U.S. Cl. .................................................... 65/30,
65/91, 65/99 A, 65/182

[51] Int. Cl. .................................................... C03c 21/00
[50] Field of Search .......................................... 65/30, 60,
99 A, 182, 199, 91; 117/124

[56] References Cited
UNITED STATES PATENTS

| 3,467,508 | 9/1969 | Loukes et al. ............... | 65/30 |
| 3,468,652 | 9/1969 | Beck ............................. | 65/91 |
| 3,472,641 | 10/1969 | Gray ............................ | 65/60 |

FOREIGN PATENTS

| 635,217 | 6/1963 | Belgium ...................... | 65/99 A |

*Primary Examiner*—S. Leon Bashore
*Assistant Examiner*—John H. Harman
*Attorney*—Morrison, Kennedy and Campbell ABSTRACT: In a float glass process, apparatus and method to form continuous marginal ridges along each edge of the glass ribbon and a pool of molten material confined on the upper surface of the ribbon by those ridges.

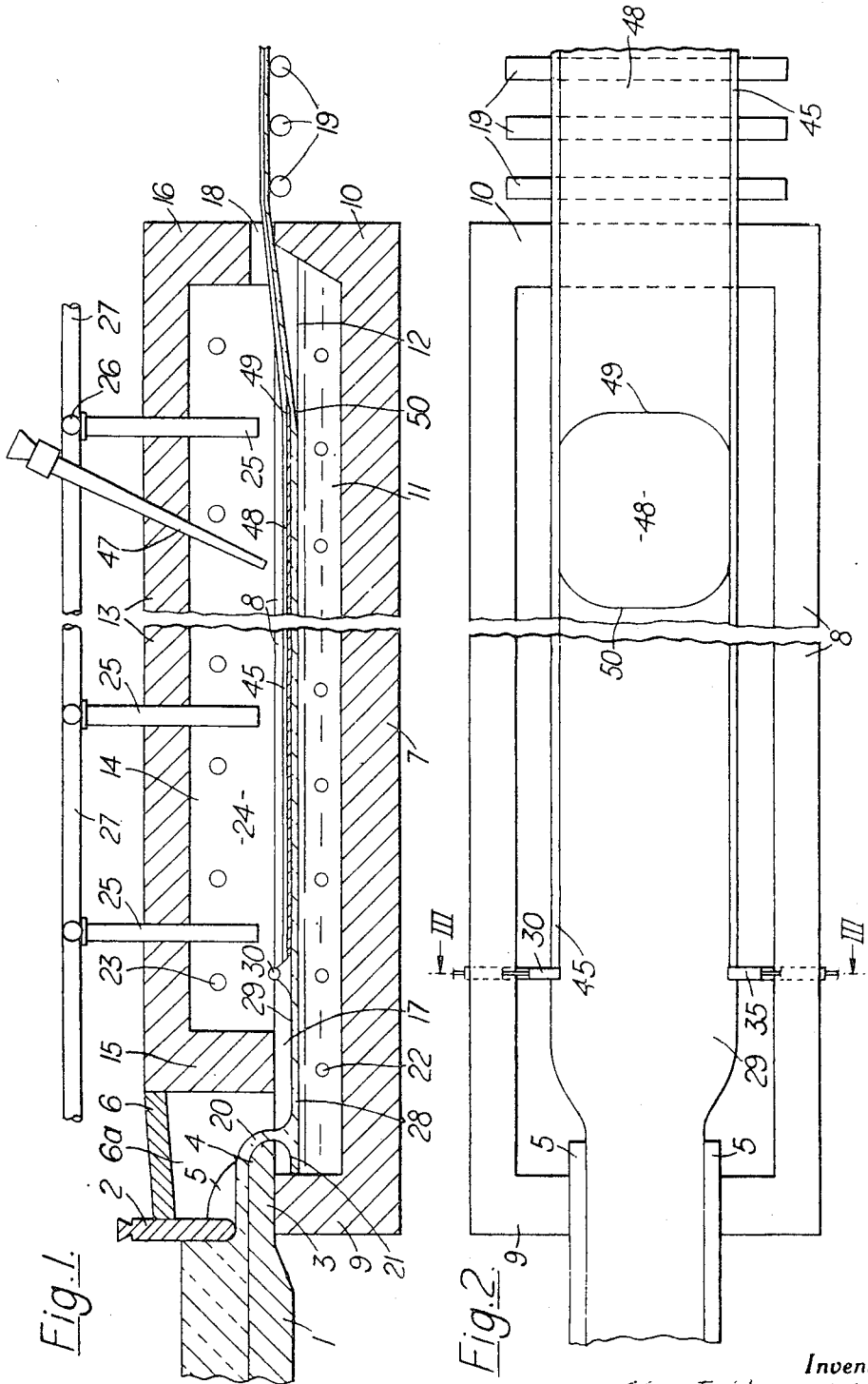

METHOD AND APPARATUS FOR MODIFICATION OF ARTICLE SURFACE CHARACTERISTICS IN A FLOAT GLASS PROCESS

BACKGROUND OF THE INVENTION

This invention relates to the manufacture of flat glass and more especially to apparatus for use in the manufacture of float glass having desired surface characteristics, in which apparatus glass is advanced in ribbon form along a bath of molten metal.

The bath of molten metal is preferably a bath of molten tin or a bath of a molten tin alloy having a specific gravity greater than glass and in which tin predominates.

It is the main object of the present invention to provide improved apparatus for use in the manufacture of flat glass, in which apparatus provision is made for modifying the surface constitution of the glass by confining a pool of molten material on the upper surface of the glass, in order to produce flat glass having desired surface characteristics.

SUMMARY

The invention provides a process for manufacturing flat glass having desired surface characteristics in which glass is delivered at a controlled rate to and is advanced along a bath of molten metal as a layer of molten glass in ribbon form, the viscosity of the glass is controlled by gradually cooling the glass as it is advanced, opposite regions of the margins of the ribbon of glass are lifted off the bath surface and allowed subsequently to collapse to form continuous marginal ridges along both edges of the ribbon, and a pool of molten material is maintained on a part of the upper surface of the glass ribbon so that said ribbon advances beneath the pool, said pool being confined laterally by the said marginal ridges.

In a preferred process each margin assumes a stepped formation as it is lifted off the bath, which formation subsequently collapses to form a folded marginal ridge.

The invention also comprehends apparatus for use in the manufacture of flat glass having desired surface characteristics comprising a tank structure containing a bath of molten metal, means for delivering glass at a controlled rate to the bath and for advancing the glass along the bath as a layer of molten glass in ribbon form, thermal regulators mounted in the tank structure for controlling the viscosity of the glass so as to ensure that the glass is gradually cooled as it is advanced, two pairs of driven edge rolls mounted opposite each other at the sides of the tank structure above the surface level of the bath so that the margins of the ribbon of glass are lifted off the bath surface as they are gripped between the edge rolls and each margin assumes a stepped formation which collapses to form a folded marginal ridge as the glass is advanced beyond the edge rolls, and means for supplying molten material on to the upper surface of the ribbon on glass to form a pool of molten material which is laterally contained by said ridges.

Preferably said means for supplying molten material on to the upper surface of the ribbon of glass comprises a conduit mounted in the tank structure above the surface level of the bath.

The pool of molten material which is laterally contained on the upper surface of the ribbon of glass by the marginal ridges may be a pool of a molten salt or a molten metal. The material may be for effecting a simple treatment of the top surface of the advancing ribbon of glass or it may be employed in an electrolytic method of modifying the surface characteristics of either the top surface or the undersurface or both surfaces of the glass ribbon in the manner described and claimed in U.S.A. Pat. No. 3,467,508.

The shaping of the ribbon of glass with marginal ridges means that the advancing ribbon assumes a shallow troughlike cross section in which the pool layer of molten material of a predetermined depth can be confined.

BRIEF DESCRIPTION OF THE DRAWINGS

FIG. 1 is a sectional elevation of apparatus according to the invention including a tank structure containing a bath of molten metal, a roof structure over the tank structure and apparatus for pouring molten glass into the bath, FIG. 2 is a plan view of the tank structure illustrated in FIG. 1.

DESCRIPTION OF THE PREFERRED EMBODIMENT

Figure 3:
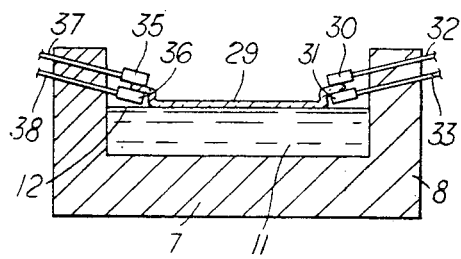
FIG. 3 is a section on line III—III of FIG. 2 showing the position of two pairs of driven edge rolls for shaping the margins of the ribbon of glass being advanced along the glass.

Referring to FIG. 1 and 2 of the drawings a forehearth of a continuous glass melting furnace is indicated at 1 and a regulating tweel at 2. The forehearth ends in a spout 3 comprising a lip 4 and side jambs 5 one of which is shown. The lip 4 and side jambs 5 together constitutes a spout of generally rectangular cross section, and a cover not shown is secured over the spout.

The spout 3 is disposed above the floor 7 of an elongated tank structure including sidewalls 8 joined together by an integral end wall 9 at the inlet end of the tank and an integral end wall 10 at the outlet end of the tank. The tank structure contains a bath 11 of molten metal, for example molten tin or an alloy of molten tin having a specific gravity greater than that of glass and in which tin predominates. The level of the surface of the molten bath is indicated at 12.

A roof structure is supported over the tank structure, and the roof structure includes a roof 13, sidewalls 14 and end walls 15 and 16 respectively at the inlet and outlet ends of the tank.

The end wall 15 extends downwardly close to the surface 12 of the molten metal bath to define an inlet 17 through which molten glass is advanced. The outlet end wall 16 of the roof structure defines with the outlet end wall 10 of the tank structure an outlet 18 through which the ultimate ribbon of glass of prescribed thickness is discharged from the bath. The roof structure is extended back to the tweel 2 by a roof element 6 and sidewalls 6a which define with the tweel 2 and the end wall 15, a chamber enclosing the spout 3.

Driven conveyor rollers 19 are mounted outside the outlet ends of the tank and are disposed somewhat above the level of the top of the end wall 10 of the tank structure. The rollers 19 convey the ultimate ribbon of glass through the outlet 18 to an annealing lehr in well-known manner, and also apply tractive effort to the ribbon of glass to assist in advancing the ribbon along the bath.

Molten glass 20 is poured into the bath of molten metal from the spout 3 and the tweel 2 regulates the rate of flow of the molten glass 20 over the spout lip 4. The spout is vertically spaced from the surface of the bath so that the molten glass has a free fall of a few inches to the bath surface, which distance is such as to ensure the formation of a heel 21 of molten glass behind the glass falling from the spout, which heel extends up to the end wall 9 of the tank structure.

The temperature of the glass as it is advanced along the bath is regulated from the inlet end to the discharge end by providing thermal regulators 22 immersed in the bath and thermal regulators 23 in the headspace 24 defined over the bath by the roof structure. The roof 13 is provided at intervals with ducts 25 which are connected to headers 27 through which a protective atmosphere is fed into the headspace 24 over the bath. This creates a plenum of protective gas in the headspace, which is a substantially closed headspace, and there is outward flow of protective gas through the inlet 17 and the outlet 18.

The temperature of the molten glass delivered to the bath is regulated by the thermal regulators 22 and 23 so as to ensure that a layer of molten glass 28 is established on the bath. This layer is advanced along the bath through the inlet 17 and as it is advanced there is free lateral flow of the molten glass under the influence of surface tension and gravity until there is developed from the layer 28 of molten glass a buoyant body 29 which is advanced as a ribbon of float glass along the the bath.

As it is advanced the ribbon is shaped to a shallow, troughlike configuration, so that a pool of molten material may be confined laterally on the upper surface of the ribbon of glass and completely isolated from the molten metal bath.

The shaping of the margins of the ribbon of glass so that it assumes this form of a shallow trough is illustrated in FIGS. 3 to 7.

Two pairs of driven edge rolls are mounted opposite each other at the sides of the tank structure. As shown in FIG. 3 edge rolls 30 and 31 are mounted at the right hand side of the bath on the ends of shafts 32 and 33. The edge rolls 30 and 31 have short barrels which are shown more clearly in FIG. 5 and their shafts 32 and 33 are mounted in bearings, not shown, in the sidewall of the tank structure. The shafts may be of heat resistant steel and the barrels of the edge rolls may be of graphite. The edge rolls may be water cooled. The shafts 32 and 33 are inclined downwardly at a slight angle and the inner end of the lower edge 31 of the pair is positioned above the surface level 12 of the bath of molten metal as shown clearly in FIG. 5.

The opposite pair of identical edge rolls 35 and 36 are similarly mounted on shafts 37 and 38 which extend through the opposite sidewall of the tank structure.

Figure 5:
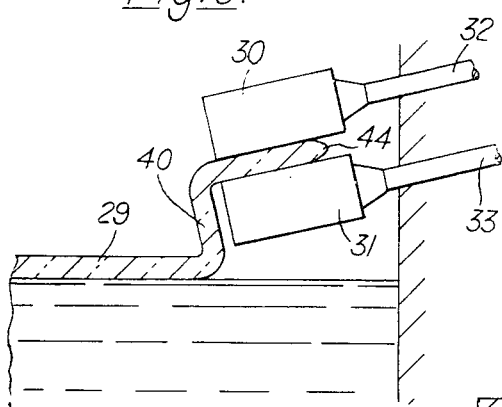
FIG. 5 is a detailed section on line V—V of FIG. 4.
Figure 6:
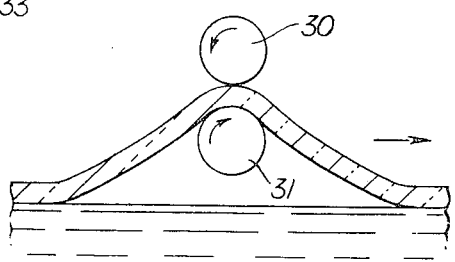
FIG. 6 is a detailed section on line VI—VI of FIG. 4.

The margins of the ribbon of glass are gripped between the pairs of edge rolls so that the margins of the glass ribbon are lifted off the bath surface as they are gripped and each margin assumes a stepped formation which is indicated in FIG. 3 but illustrated in more detail in FIGS. 5 and 6.

The lifting of the margin of the glass between the edge rolls 30 and 31 produces the stepped formation with a clearly defined rising portion 40. The thickness of the glass in this rising portion 40 may reduce slightly to form a waist due to slight stretching of the glass as it is lifted upwardly from the bath surface between the edge rolls.

Figure 4:
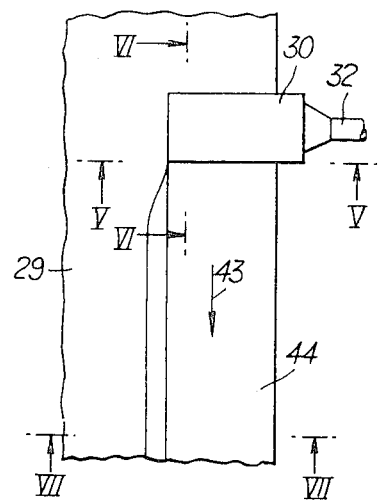
FIG. 4 is a plan view of a part of one margin of the ribbon downstream of the edge rolls.
Figure 7:
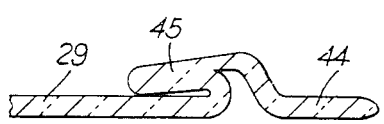
FIG. 7 is a section through one margin of the ribbon of glass downstream of the edge rolls on line VI—VI of FIG. 4, and showing the shape assumed by the margin after edge rolling.

After the ribbon of glass has passed beyond the edge rolls in the direction of the arrow 43 in FIG. 4, during the continual advance of the ribbon of glass along the surface of the bath of molten metal, the step formation produced by the edge rolls begins to collapse inwardly and this collapse results in the margin of the glass eventually taking up the. formation illustrated in FIG. 7. The barrels of the edge rolls 30, 31, 35 and 36 may be specially profiled to enhance the formation of marginal ridges. The glass falls over and the outside edge 44 of the ribbon of glass drops back onto the surface 12 of the molten metal bath.

Figure 8:
FIG. 8 is a section of line VII—VII of FIG. 4 showing the final form of the marginal ridge formed on one edge of the ribbon of glass.

By the time the glass reaches the formation shown in FIG. 6 the shape of a clearly defined marginal ridge 45 is evident, and as the ribbon further advances this ridge sinks down onto the surface of the bath to give the final shape of the folded marginal ridge which is illustrated in FIG. 8. By this time the viscosity of the glass is such that this ridge 45 holds its form as the ribbon of glass is further advanced.

At the same time an identical ridge is being formed on the other margin of the ribbon and the two ridges 45 together give the ribbon a shallow troughlike configuration which enables molten material to be confined on the top surface of the ribbon of glass as it is advanced along the bath of molten metal.

A conduit 47 is mounted through the roof of the tank structure and ends above the surface level of the bath. Through this conduit molten material is supplied onto the upper surface of the ribbon of glass to form a pool of molten material 48 which is laterally contained by the marginal ridges 45. Forward movement of the downstream edge 49 of the pool is inhibited by the upward slope of the ribbon of glass as it is lifted from the bath surface for discharge through the outlet 18.

Usually the quantity of molten material in the pool 48 is such that the pool finds its own equilibrium thickness on the top surface of the glass, which in the case of a pool of molten tin on the top surface of the glass is about one-quarter inch. The upstream edge 50 of the pool will thus remain stationary relative to the tank structure and the ribbon of glass is advanced underneath the pool.

The pool 48 may be a pool of molten material which itself provides a surface treatment of the upper surface of the glass ribbon or migrates into the glass under controlled interfacial conditions between the pool and the glass. When the pool comprises a molten metal or alloy, the pool may be used in an electrolytic treatment of the top or bottom surface of the ribbon of glass.

As the ribbon of glass with its marginal ridges is advanced along the bath of molten metal it is gradually cooled and the increase in viscosity which takes place gradually as the ribbon is advanced ensures that the marginal ridges folded into the margins of the ribbon of glass retain their form. This form is such that the ridges do laterally confine a pool of sufficient depth for the desired treatment of the upper surface of the ribbon, but in no way impede the lifting of the ribbon of glass from the surface of the bath of molten metal at the outlet end of the tank structure for discharge through the outlet 18 onto the rollers 19.

We claim:

1. A process for manufacturing float glass having desired surface characteristics, comprising delivering glass at a controlled rate to a bath of molten metal, advancing the glass along the bath as a layer of molten glass in ribbon form, controlling the viscosity of the glass by gradually cooling the glass as it is advanced, lifting opposite regions of the margins of the ribbon of glass off the bath surface, simultaneously gripping the lifted margins to impart a stepped formation to the sides of the ribbon with inwardly sloping rising portions, releasing the gripped margins and forming continuous marginal ridges along both edges of the ribbon by the collapse of the step-formed ribbon sides as the gripped margins are released, and maintaining a pool of molten material for modifying the upper surface of the glass on a part of the upper surface of the marginally ridged glass ribbon so that said ribbon advances beneath the pool, said pool being confined laterally by the said marginal ridges.

2. Apparatus for use in the manufacture of float glass having desired surface characteristics comprising a tank structure containing a bath of molten metal, means for delivering glass at a controlled rate to the bath and for advancing the glass along the bath as a layer of molten glass in ribbon form, thermal regulators mounted in the tank structure for controlling the viscosity of the glass so as to ensure that the glass is gradually cooled as it is advanced, two pairs of driven edge rolls mounted opposite each other at the sides of the tank structure above the surface level of the bath, inwardly of the path of travel of the margins of the ribbon of glass along the bath, and axially directed downwardly to the bath surface to lift the ribbon margins off the bath surface as they are gripped between the edge rolls and force the gripped margins inwardly to assume a stepped formation which collapses upon itself to form a folded marginal ridge as the glass is advanced beyond the edge rolls, and means for supplying molten material on to the upper surface of the ribbon of glass to form a pool of molten material which is laterally contained by said ridges.

* * * * *